United States Patent
Eguchi

(10) Patent No.: US 7,158,783 B2
(45) Date of Patent: Jan. 2, 2007

(54) RADIO DEVICE COMMUNICATION SETTING METHOD OF SWITCHING FROM FIRST SETTING INFORMATION TO SECOND SETTING INFORMATION

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 11/002,343

(22) Filed: Dec. 2, 2004

(65) Prior Publication Data

US 2005/0136909 A1 Jun. 23, 2005

(30) Foreign Application Priority Data

Dec. 4, 2003 (JP) ............... 2003-406543
Nov. 25, 2004 (JP) ............... 2004-339966

(51) Int. Cl.
H04M 3/00 (2006.01)
H04M 3/16 (2006.01)

(52) U.S. Cl. ............. 455/420; 455/418; 455/411; 455/410; 380/247; 380/270

(58) Field of Classification Search ............ 455/420, 455/418, 411, 410; 380/247

See application file for complete search history.

(56) References Cited

U.S. PATENT DOCUMENTS

2002/0061748 A1* 5/2002 Nakakita et al. ............ 455/435
2002/0081994 A1* 6/2002 Aoyagi ....................... 455/411
2003/0059051 A1 3/2003 Hatano et al.
2003/0092395 A1 5/2003 Gassho et al.
2004/0203384 A1* 10/2004 Sugikawa et al. ........ 455/41.2

FOREIGN PATENT DOCUMENTS

| EP | 1 271 895 A2 | 1/2003 |
| EP | 1 274 194 A1 | 1/2003 |
| JP | 2000-059388 | 2/2000 |

* cited by examiner

Primary Examiner—Nick Corsaro
Assistant Examiner—Christopher M. Brandt
(74) Attorney, Agent, or Firm—Morgan & Finnegan, LLP

(57) ABSTRACT

When setting information for wireless communication is registered for a peripheral device by an information processing apparatus, the original setting information set in the information processing apparatus is backed up, then the setting information based on unique information of the peripheral device is set in both the information processing apparatus and the peripheral device, thereby a wireless communication is established between the information processing apparatus and the peripheral device. Then the original setting information is copied in the peripheral device via the wireless communication. Thereafter, the information processing apparatus restores the backed up original setting information.

23 Claims, 8 Drawing Sheets

RADIO DEVICE COMMUNICATION SETTING METHOD OF SWITCHING FROM FIRST SETTING INFORMATION TO SECOND SETTING INFORMATION

FIELD OF THE INVENTION

The present invention relates to a radio device communication setting method.

BACKGROUND OF THE INVENTION

In recent years, the proliferation of wireless LAN devices has enable computer peripheral devices, such as a printer for instance, to be connected via air wires. Various wireless LAN methods including the IEEE 802.11 standard, the Bluetooth standards and similar ones are becoming well known, pushing the IEEE 802.11 standard wireless LAN method to become a de facto global standard.

In accordance with the popularization of personal computers including IEEE 802.11 standard wireless LAN devices, peripheral devices such as printers, also including IEEE 802.11 standard wireless LAN device, are increasingly used.

The wireless LAN device communicating by an IEEE802.11b standard, which is one of the IEEE 802.11 standards, comprise a star-connection mode called infrastructure mode and a one-to-one connection mode called ad hoc mode that enable communication with another computer or the like, using either one of these modes. In the infrastructure mode, the MAC address of an access point at the center of the star connection is generally used as an initial group ID.

Further, in the ad hoc mode, although communication is standardized on the premise of the use of SSID, communication is frequently performed by using an IP address instead of the SSID of the wireless LAN device. In this case, the IP address initial value of the wireless LAN device is set to "0:0:0:0" or the like, and the IP address of the other wireless LAN device is set to "0:0:0:1" or the like. Then, the wireless LAN devices search for respective IP addresses and perform communication.

Since the "MAC address" referred to as an initial ID of the infrastructure mode is a device unique number, thus the ID of a wireless LAN device placed in an arbitrary room does not overlap the ID of another wireless LAN device placed in a neighboring house or office. Accordingly, the wireless LAN device placed in an arbitrary room is does not connect to a personal computer or peripheral device in a neighboring house or office.

In Japan, a maximum of 4 channels can be ensured as non-overlapped frequency channels for IEEE 802.11b wireless LAN devices. Among these 4 channels, a channel where interference wave is reduced as much as possible is used instead of a channel used by another user.

Further, in another known system, a frequency channel is determined from a serial number for the purpose of allocation of station (Japanese Patent Application Laid-Open No. 2000-059388).

When a peripheral device is connected to a computer via a wireless LAN, two types of problems occur regarding security and peripheral device user interface occur.

In some cases, the initial group ID of a wireless LAN card or access point is a banal initial value such as "Anyone". Further, in many cases, no encryption key is set. Accordingly, the wireless LAN may be erroneously connected to a wireless LAN device newly placed in a neighboring house or office. In such case, data can be viewed from both wireless LANs.

In the infrastructure mode, a wireless LAN device can receive a beacon outputted from an access point placed in a neighboring house or office. If no encryption key is set at the access point, as a group ID can be obtained, and eavesdropping becomes possible by receiving the beacon from the other access point.

Further, in the ad hoc mode, the initial IP address value is a common one in many cases. This creates a serious security problem in communication.

Further, in the case of IEEE 802.11b wireless LAN device, since the number of selectable channels is small, there is a high probability to observe an overlap of selected frequency channels between a wireless LAN device and neighboring wireless LAN devices. Accordingly, the IDs and/or initial IP addresses can be the same with high probability, even when determining a frequency channel from a serial number, thus the probability of erroneous connection with a network in a neighboring house or office increases.

More particularly, in a computer peripheral device such as a printer, the setting user interface is often poor. Accordingly, before the execution of real radio communication, a radio communication to the computer is performed by using a simple initial ID or IP address, so that a new ID or IP address for the peripheral device is set using the computer's rich user interface. Otherwise, the computer is cable-connected to the peripheral device, to set a new ID or IP address for the peripheral device using the computer and executing an initial setting program.

However, security problems still occur in both cases, wherein the setting phase is operated via a cable or radio communication, since the setting operation is very complicated.

SUMMARY OF THE INVENTION

The present invention contributes to facilitation of wireless LAN device communication setting even in a situation where the peripheral device has a poor user interface. Further, another aspect of the present invention is to safely connect to desired wireless LAN, even when located in a collective house such as an apartment, or urban residential area and business district, where wireless LAN system are often used.

For example, a wireless LAN device communication setting method comprising: a first setting step, between a computer and a peripheral device, configuring wireless LAN communication setting information based on identification information of the peripheral device; then a notification step of notifying setting information already stored in the computer to the peripheral device by using the settings of the first setting step; and a switching step of switching to the setting information notified at the notification step.

Other features and advantages of the present invention will be apparent from the following description taken in conjunction with the accompanying drawings, in which similar reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
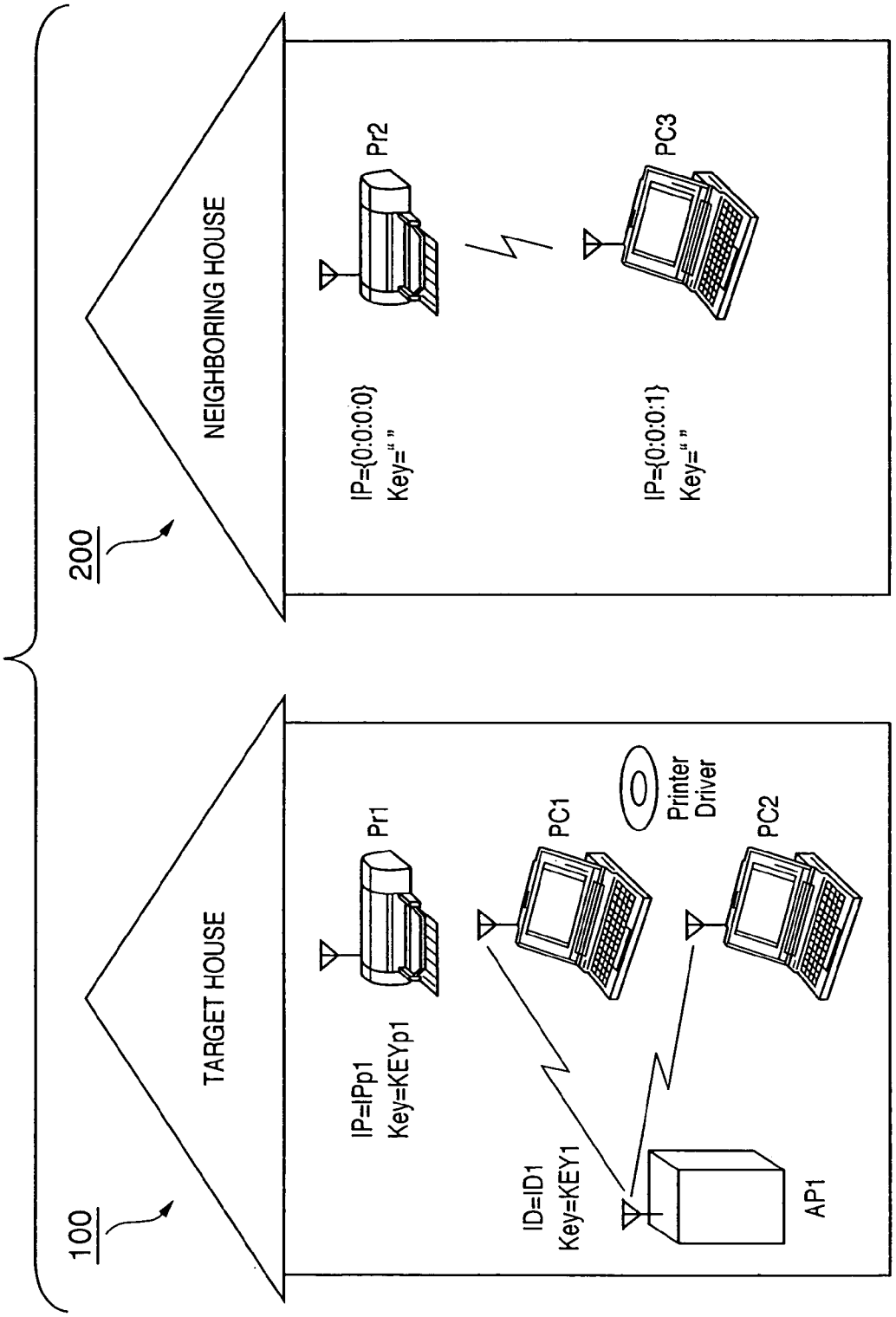
FIG. 1 is a block diagram showing a wireless LAN system 100 in a house as a first embodiment of the present invention and a wireless LAN system 200 in a neighboring house.

Preferred embodiments of the present invention will now be described in detail in accordance with the accompanying drawings.

In the embodiments described below, in a wireless LAN environment, an ID and an encryption key are set, and plural computers perform radio communication. In this environment, as a wireless LAN device setting method for a newly-connected peripheral device, when a driver of the peripheral device is installed in a computer to be connected to the peripheral device, if a unique number of the peripheral device is inputted into the computer, the communication settings used in the above wireless LAN device of the above computer are automatically set as communication settings for the wireless LAN device of the peripheral device.

Further, in the above peripheral device, an initial encryption key, ID or IP address for the wireless LAN device of the peripheral device is calculated based on the unique number of the peripheral device, and the calculated information is stored in a memory as temporary setting for the wireless LAN device of the peripheral device. When the driver software for the peripheral device is installed in the above computer, the computer receives the input unique number of the peripheral device, and the ID and the encryption key used in the wireless LAN device of the computer are backed up in the memory of the computer. Then a calculation similar to the one in the peripheral device is applied to the unique number of the peripheral device to calculate the encryption key for the ID or IP address and set for the wireless LAN device of the computer. The original ID and the encryption key used by the computer before the installation of the driver are radio-transmitted to the peripheral device, thereafter, the original ID and the encryption key are restored. The peripheral device receives the original ID and the encryption key transmitted from the computer, and sets the original ID and the encryption key for the wireless LAN device of the peripheral device.

In this arrangement, a unique group ID and an encryption key are set simply by installing the driver of a peripheral device into a computer, an this is accomplished even in the case of a computer peripheral device such as a printer which often has a poor user interface. In light of this, the probability of erroneous connection to a network in a neighboring house or office can be reduced. Further, the peripheral device can be connected with a desired computer with higher safety than in conventional techniques.

Further, in another computer belonging to the same radio communication group, similar to the above computer, when the driver of the peripheral device is installed, if the unique number for the peripheral device is not inputted, the setting of the wireless LAN device of the computer is not changed. That is, processing of copying wireless LAN setting information to the peripheral device is skipped, and the driver for the peripheral device is installed as usual.

In this arrangement, in a case where a peripheral device is set in a radio communication group, it is not necessary for another computer belonging to the same radio communication group to re-set the wireless LAN device of the peripheral device. Accordingly, the other computer can perform connection setting such as driver installation regarding the peripheral device by searching for the peripheral device as in the case of a cable-connected network printer.

Further, in a computer peripheral device which becomes capable of wireless LAN communication by connection with a wireless LAN device such as a wireless LAN card, when the wireless LAN card is connected to the peripheral device, or when the wireless LAN card is connected to the peripheral device and the power of the device is turned on, an encryption key, ID or IP address calculated based on a unique number of the peripheral device is set for the wireless LAN card.

[First Embodiment]

FIG. 1 is a block diagram showing a wireless LAN system 100 as a first embodiment of the present invention and a wireless LAN system 200 in a neighboring house.

The wireless LAN system 100 has computers PC1 and PC2, a printer Pr1 and an access point AP1.

The wireless LAN system 200 in the neighboring house has a computer PC3 and a printer Pr2.

The computers PC1 to PC3 and the printers Pr1 and Pr2 respectively have a wireless LAN device (not shown). The computers PC1, PC2 and the access point AP1 form a radio network by using an ID "ID1" and an encryption key "KEY1" in the IEEE 802.11 infrastructure mode.

In the neighboring house, the computer PC3 and the printer Pr2 perform radio communication in the IEEE 802.11 ad hoc mode. As an IP address of the printer Pr2, an initial value "0:0:0:0" is used. As an IP address of the computer PC3, a value "0:0:0:1" is used. Note that an encryption key is not set.

Next, the operation of the first embodiment will be described.

Figure 2:
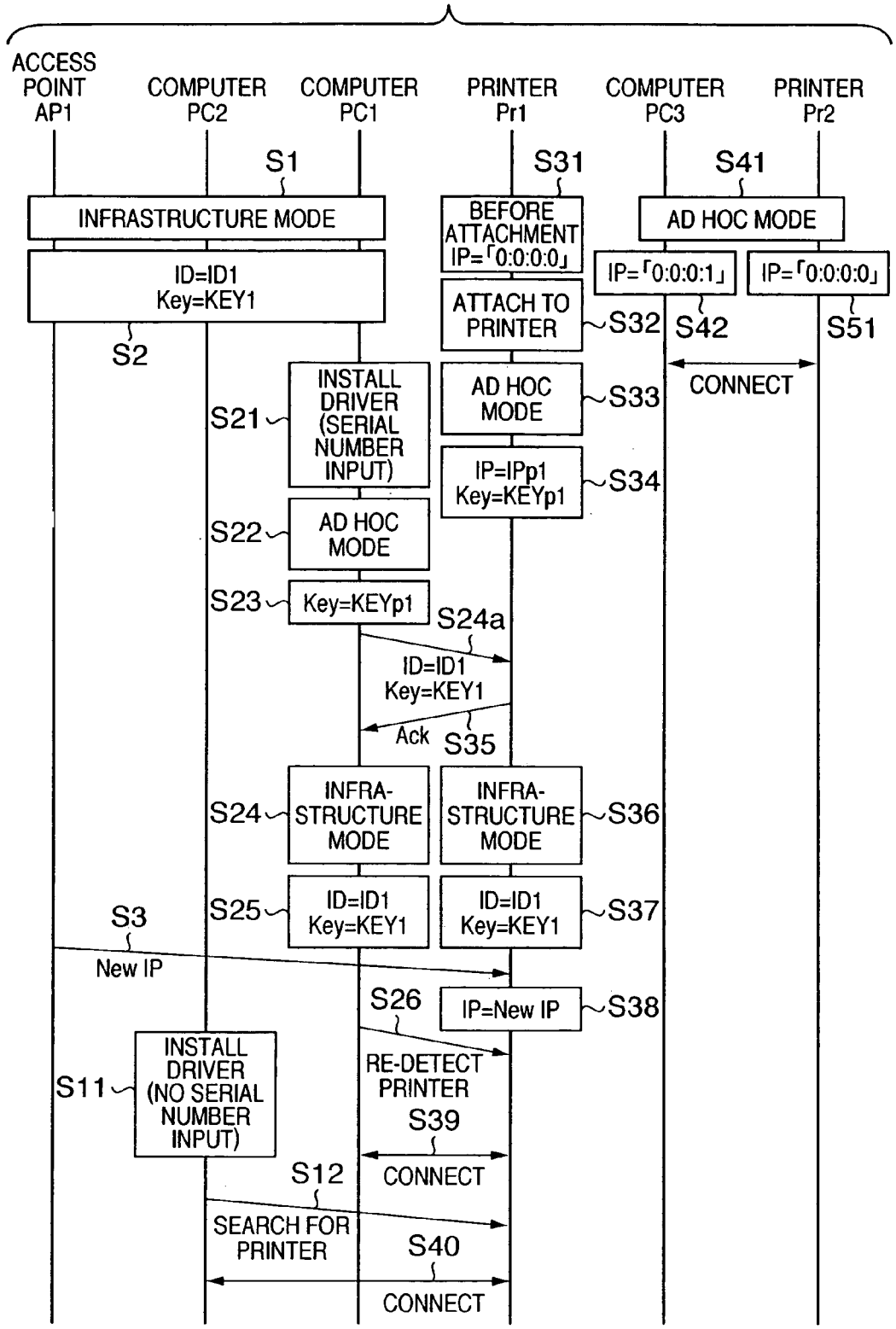
FIG. 2 is a flowchart showing the operation of the first embodiment.

FIG. 2 is a flowchart showing the operation of the present embodiment.

As described above, the computers PC1, PC2 and the access point AP1 establish a radio communication channel in the infrastructure mode (S1), and form a radio network using the ID "ID1" and the encryption key "KEY1" (S2).

Further, the computer PC3 and the printer Pr2 are in the ad hoc mode using the IP address "0:0:0:0" for printer Pr2 and the IP address "0:0:0:1" for computer PC3 (S41, S42 and S51).

When the wireless LAN device is attached to the printer Pr1 and the power of the printer is first turned on, the printer Pr1 calculates an IP address "IPp1" and an encryption key "KEYp1" based on a printer serial number. Then the printer Pr1 sets the IP address "0:0:0:0" set in the wireless LAN device as an initial value (S31 and S32) to the calculated IP address "IPp1", and sets "KEYp1" as an encryption key, and stands by in the ad hoc mode (S33 and S34).

On the other hand, in computer PC1, when the driver for printer Pr1 is installed, the serial number of printer Pr1 is inputted by a user (S21). The printer driver causes the computer to calculate the IP address "IPp1" and the encryption key "KEYp1" of the wireless LAN device of the printer Pr1 based on the serial number of the printer Pr1, with a similar algorithm to the one of the printer. Further, the printer driver sets the communication encryption key of the wireless LAN device of the computer PC1 to "KEYp1", and sets the communication mode to ad hoc mode (S22 and S23). The ID "ID1" and the encryption key "KEY1" used at this time are stored into the memory of the computer. In this manner, in the computer, the original wireless LAN setting information (ID, encryption key and the like) is backed up.

Since the IP address "IPp1" of the wireless LAN device of the printer Pr1 is known, the computer PC1 performs radio communication with the printer Pr1 in the ad hoc mode, to transmit the ID "ID1" and the encryption key "KEY1" stored in the memory of the computer to the printer Pr1 (S24a).

When the ID "ID1" and the encryption key "KEY1" have been normally transmitted to the printer Pr1 and a signal (Ack) has been returned from the printer Pr1 (S35), the communication ID and the encryption key of the wireless LAN device of the computer PC1 are re-set to the "ID1" and "KEY1" used before the setting of the printer Pr1, and the communication mode becomes the infrastructure mode (S24 and S25).

In the printer Pr1, when the communication ID "ID1" and the encryption key "KEY1" of the wireless LAN device are transmitted from the computer PC1, a signal indicating that the communication has been normally performed (Ack) is returned to the computer PC1 (S35), then, the ID "ID1" and the encryption key "KEY1" received from the computer PC1 are set as the communication ID and the encryption key of the wireless LAN device of the printer, and the communication mode becomes the infrastructure mode (S36 and S27). Then, the printer Pr1 receives a new IP address from a DHCP server cable-connected to the access point AP1 or a DHCP server function of the access point, and this IP address is automatically set (S38). After the IP address of the printer has been changed, the computer PC1 re-detects the printer, and establishes connection to the printer (S26 and S39).

After the above-described automatic setting, the printer driver for printer Pr1 is installed in the other computer PC2 without inputting the serial number (S11). The printer driver of the printer Pr1 is set such that the setting of the wireless LAN device is not performed if the serial number is not input.

When the printer driver has been installed in the computer PC2, an automatic printer search is performed as in the case of the cable connection (S12), then the automatically detected printer Pr1 is set, and the connection with the printer Pr1 can be established (S40).

The IP address' initial setting, before connecting with printer Pr1 with the wireless LAN card, is "0:0:0:0" as shown in FIG. 2. In the present embodiment, if the IP address "0:0:0:0" is not immediately changed to "IPp1" after connection with the printer Pr1, a radio wave from the wireless LAN device of the computer PC3 in the neighboring house comes to the wireless LAN device of the printer Pr1. In a case where the computer PC3 in the neighboring house tries to establish a connection with printer Pr2, since the computer PC3 is also connected to the printer Pr1, Pr1 executes printing jobs.

In view of this problem, when a wireless LAN card is connected to a printer, it is desirable that the IP address of the wireless LAN card is changed immediately after connection with the wireless LAN card or immediately after the connection with the wireless LAN card and power-on of the printer, and the radio communication is disabled before completion of IP address change and encryption key setting.

Further, upon transmission of ID and encryption key from a computer where driver software has been installed to the printer Pr1, if a communication error is not detected and an Ack signal is returned to the computer, a setting error may occur in the printer Pr1.

Generally, if a communication error beyond error correction capability of communication protocol has occurred, retransmission is required by error detection via a higher protocol. However, in the present embodiment, since a computer which is performing printer setting returns to initial communication settings upon reception of Ack signal from the printer, the computer may not receive a retransmission request.

Considering such situations, it may be arranged such that after reception of Ack signal from the wireless LAN device of the printer and it has been checked a retransmission request has not been received for a predetermined period, the initial setting of wireless LAN device of the computer is restored.

In the above setting of the wireless LAN device of the printer, if a communication error occurs and erroneous ID and encryption key are set in the wireless LAN device, the printer cannot be detected from the computer. In this case, the printer must be provided with a switch component to reset the communication settings for the wireless LAN device connected to the printer to the IP address and the encryption key calculated based on the printer serial number, and change the communication mode to the ad hoc mode as stand-by status. As the switch, a mechanical reset button may be utilized, or attachment/removal of wireless LAN card may be performed.

Further, upon changes in the of network, it may be arranged that, the communication settings of the wireless LAN device connected to the printer are reset from the computer, to IP address and the encryption key calculated based on the printer serial number, in accordance with a command for initialization by radio communication, and the communication mode are set to the ad hoc mode as a stand-by status.

Note that as a frequency channel for connection between the computer and the printer, the radio communication channel used by that time is used. Any channel may be used as a channel for setting of the wireless LAN system of the printer. If the channel for setting the wireless LAN system of the printer is different from the channel used by the computer by that time, channel information is also transmitted, to perform channel setting in the wireless LAN device of the printer side.

Further, as the channel for setting the wireless LAN system of the printer, an available channel other than the channel used by the computer by that time may be used so as to avoid overlap with other communication.

Further, the printer driver can be similarly executed by installation from a storage medium such as a CD-ROM or installation from a network.

In the present embodiment, the printer is used as a computer peripheral device, however, other computer peripheral device such as a digital camera or a scanner may be used as the above computer peripheral device.

[Second Embodiment]

Next, a second embodiment of the present invention will be described.

Figure 3:
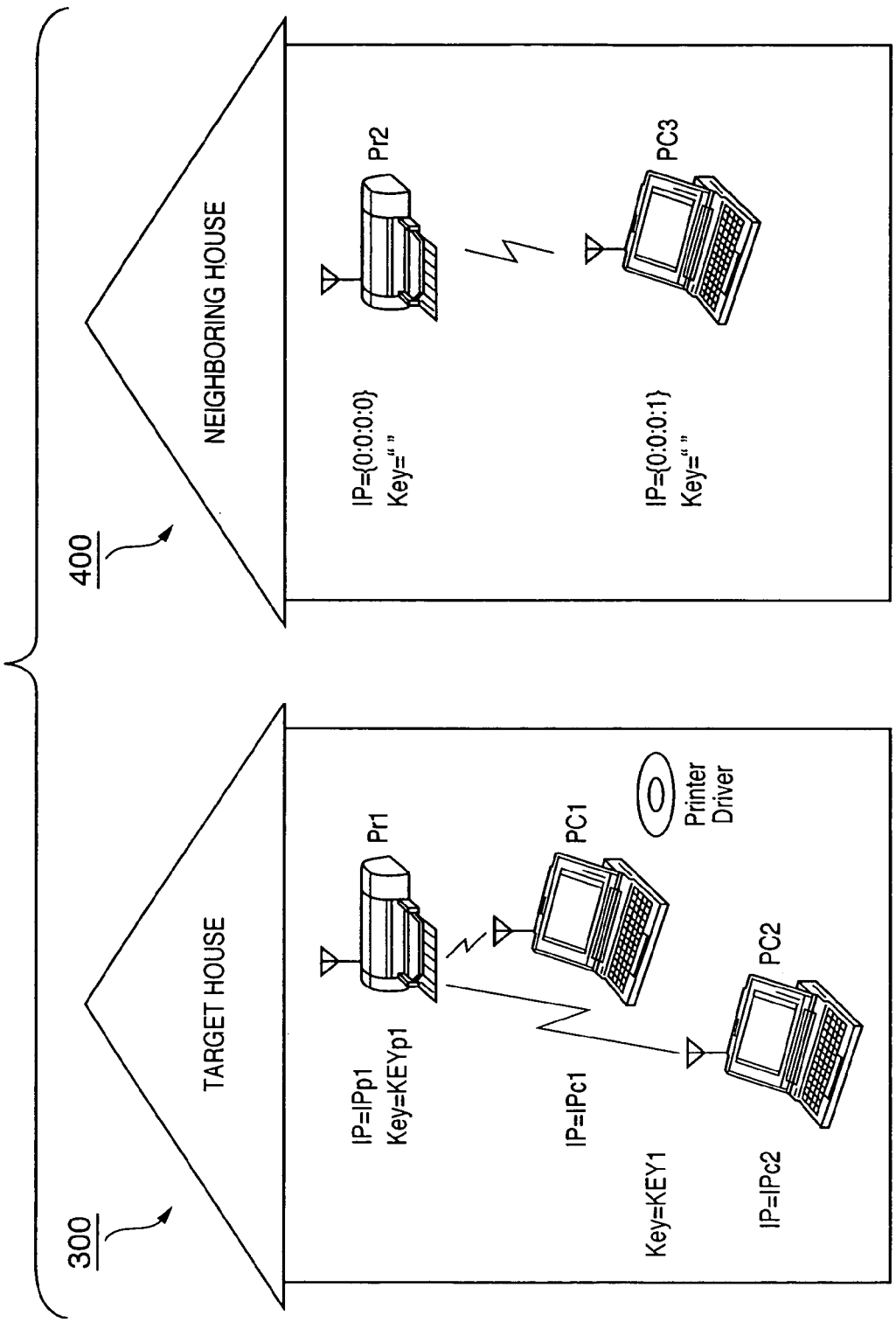
FIG. 3 is a block diagram showing a wireless LAN system 300 in a house as a second embodiment of the present invention and a wireless LAN system 400 in a neighboring house.

FIG. 3 is a block diagram showing a wireless LAN system 300 in a house as the second embodiment of the present invention and a wireless LAN system 400 in a neighboring house.

As shown in FIG. 3, the wireless LAN system 300 has computers PC1, PC2 and a printer Pr1 placed in the house, and the wireless LAN system 400 in the neighboring house has a computer PC3 and a printer Pr2.

The computers PC1 to PC3 and the printers Pr1 and Pr2 respectively have a wireless LAN device (not shown). The computers PC1 and PC2 form a radio network in the IEEE 802.11 ad hoc mode.

In this radio network, the IP address of the computer PC1 is "IPc1", and the IP address of the computer PC2 is "IPc2". The IP address of the printer Pr1 is "IPp1" and communication is performed using an encryption key "KEY".

Further, in the neighboring house, the computer PC3 and the printer Pr2 are set such that they perform radio communication in the IEEE 802.11 ad hoc mode. The IP address of the printer Pr2 is an initial value "0:0:0:0", the IP address of the computer PC3 is "0:0:0:1", and an encryption key is not set.

Next, the operation of the second embodiment will be described.

Figure 4:
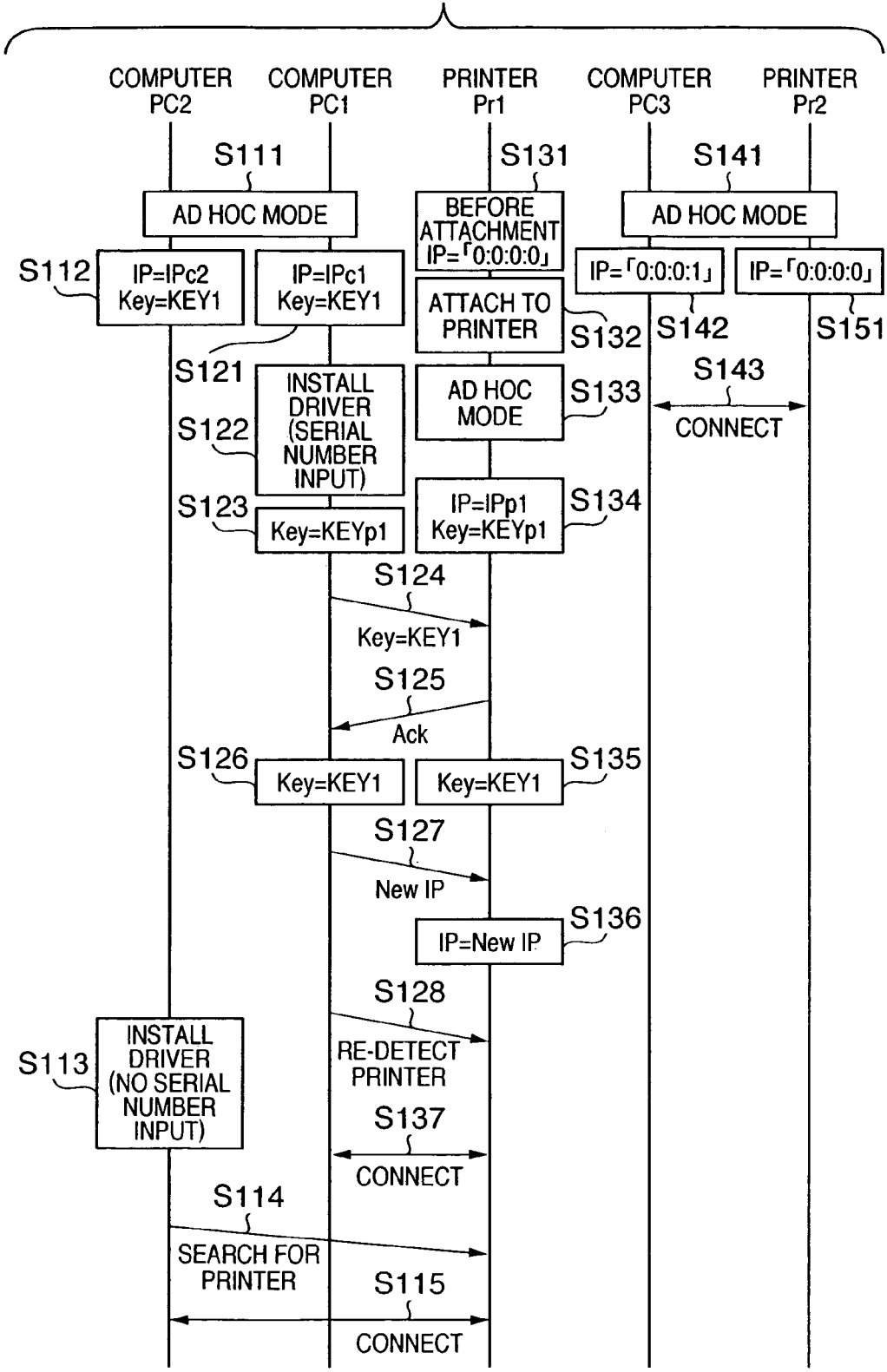
FIG. 4 is a flowchart showing the operation of the second embodiment.

FIG. 4 is a flowchart showing the operation of the second embodiment.

The computer PC1 sets the IP address to "IPc1" and the encryption key to "KEY1" (S121), and the computer PC2 sets the IP address to "IPc2" and the encryption key to "KEY" (S112), stand by in the ad hoc mode (S111).

When the wireless LAN device has been attached to the printer Pr1 (S132) and the power of the printer is first turned on, the printer Pr1 calculates the IP address "IPp1" and the encryption key "KEYp1" based on the printer serial number (S134), then sets the IP address "0:0:0:0" set in the wireless LAN device as an initial value (S131) to the calculated IP address "IPp1" and the encryption key "KEYp1", and stands by in the ad hoc mode (S133).

On the other hand, in the computer PC1, when the driver of the printer Pr1 is installed, the serial number of the printer Pr1 is inputted by a user (S122). The printer driver causes the computer to calculate the IP address "IPp1" and the encryption key "KEYp1" of the wireless LAN device of the printer Pr1 based on the serial number of the printer Pr1, with a similar algorithm to that of the printer, and set the encryption key "KEYp1" for communication by wireless LAN device of the computer PC1. At this time, the printer driver stores the encryption key "KEY1" used by that time in the memory of the computer (S123).

Since the IP address "IPp1" of the wireless LAN device of the printer Pr1 is known, the computer PC1 performs radio communication with the printer Pr1 by using the encryption key "KEYp1" in the ad hoc mode, to transmit the encryption key "KEY1" stored in the memory of the computer to the printer Pr1 (S124).

When the encryption key "KEY1" has been normally transmitted to the printer Pr1 and a signal (Ack) has been returned from the printer Pr1 (S125), the computer PC1 re-sets the encryption key of the wireless LAN device to "KEY1" used before the setting of the printer Pr1 (S126).

Further, the printer Pr1 sets the encryption key "KEY1" transmitted from the computer PC1 as the wireless LAN encryption key (S135).

Then, if the computer PC1 has a DHCP server function, the printer Pr1 receives a new IP address from the computer PC1 (S127), and this IP address is automatically set (S136). After the change of the IP address of the printer, the computer PC1 re-detects the printer (S128), and the printer Pr1 is connected with the computer PC1 (S137).

In this arrangement, the encryption key already used in the wireless LAN network can be also set in the newly set printer Pr1.

Note that it may be arranged such that the IP address of the printer used for encryption key setting is used without any change, otherwise, a new IP address is assigned from another computer.

In the other computer PC2, when the above encryption key and the IP address have been set, the printer driver of the printer Pr1 is installed without input of serial number (S113). The printer driver of the printer Pr1 is set such that the setting of the wireless LAN device is not performed if the serial number is not input. When the printer driver has been installed in the computer PC2, as automatic printer search is performed as in the case of the cable connection (S114), the automatically detected printer Pr1 is set, then connection with the printer Pr1 can be established (S115).

Note that as a frequency channel for connection between the computer and the printer, the radio communication channel used by that time is used. Any channel may be used as a channel for setting of the wireless LAN system of the printer. If the channel for setting the wireless LAN system of the printer is different from the channel used by the computer by that time, channel information is also transmitted, to perform channel setting in the wireless LAN device of the printer side.

Further, as the channel for setting the wireless LAN system of the printer, an available channel other than the channel used by the computer by that time may be used so as to avoid overlap with other communication.

Further, in the neighboring house, the IP address of the computer PC3 is set to "0:0:0:1" (S142), and the printer Pr2 is set to "0:0:0:0" (S151), stand by in the ad hoc mode (S141), then mutually connected (S143).

In the second embodiment, the printer is used as a computer peripheral device, however, other computer peripheral device such as a digital camera or a scanner may be used as the above computer peripheral device.

According to the present invention, even in a peripheral device having a poor user interface such as a printer, wireless LAN device communication setting can be automatically made in a very simple manner. Further, even in urban residential area and business district, where a wireless LAN system is used in a neighboring house or office, a desired device can be safely connected to a desired wireless LAN system without erroneous connection to such other wireless LAN system.

[Third Embodiment]

In the present embodiment, information processing apparatus such as the above-described personal computer, the peripheral device such as the above-described printer, and a control program for these devices will be described in detail. In this embodiment, the information processing apparatus is to establish radio connection with the peripheral device.

Figure 5:
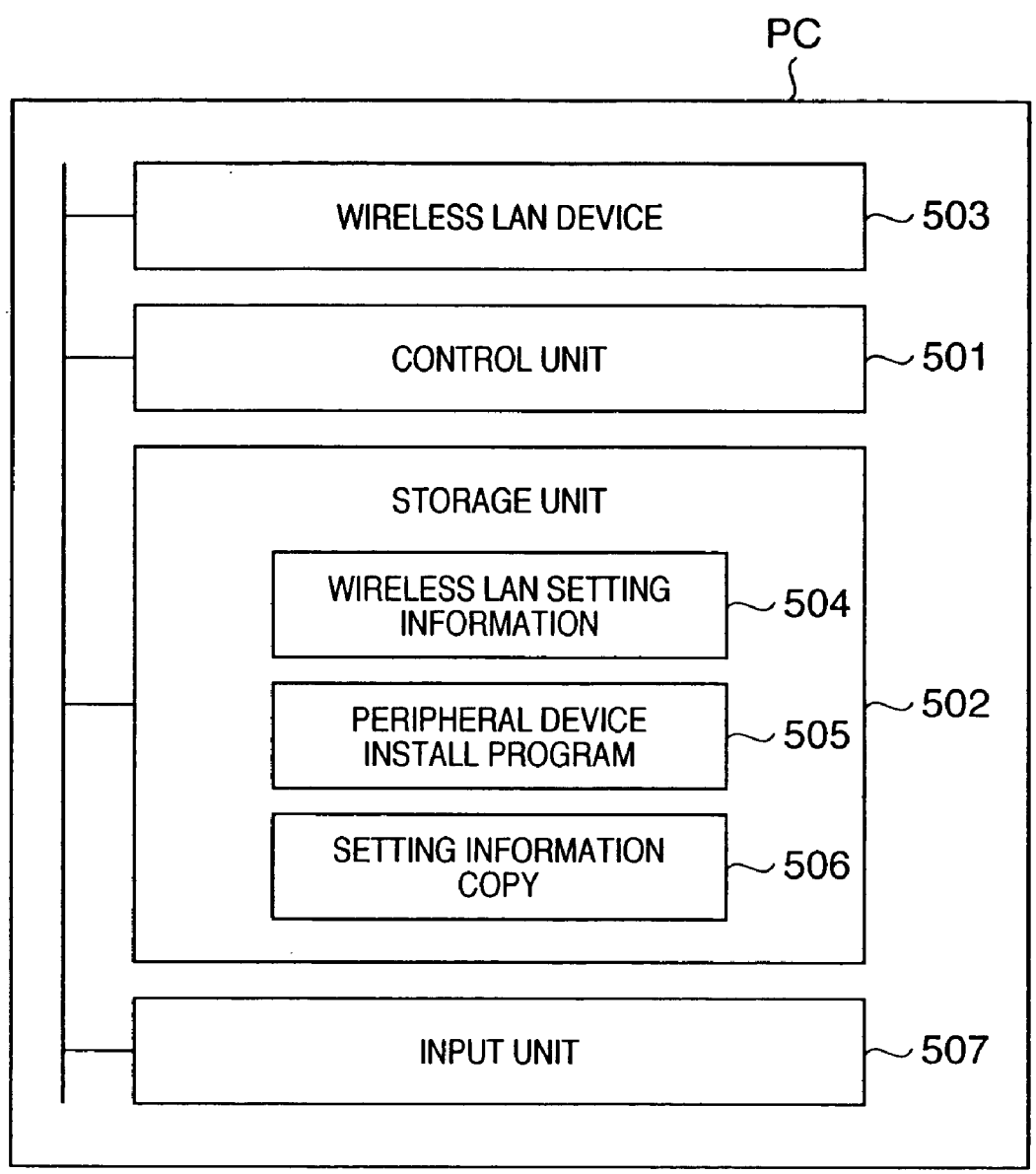
FIG. 5 is a block diagram showing an information processing apparatus according to a third embodiment.

FIG. 5 is a block diagram showing the information processing apparatus according to the third embodiment. In FIG. 5, a control unit 501 includes a CPU, a ROM, and a RAM. A storage unit 502, which is used for storing various data and programs, has at least one of a ROM, a RAM a hard disk drive and the like. A wireless LAN device 503, which is a radio communication circuit such as a wireless LAN card, may be incorporated in a personal computer, or may be connected to the outside of the personal computer. An input unit 507 is an input device such as a keyboard or a mouse.

The storage unit 502 holds wireless LAN setting information 504 as ID and encryption key setting information which is necessary upon connection with a wireless LAN, a peripheral device install program 505, and setting information copy 506 as a duplicate (backup data) of original wireless LAN setting information.

Figure 6:
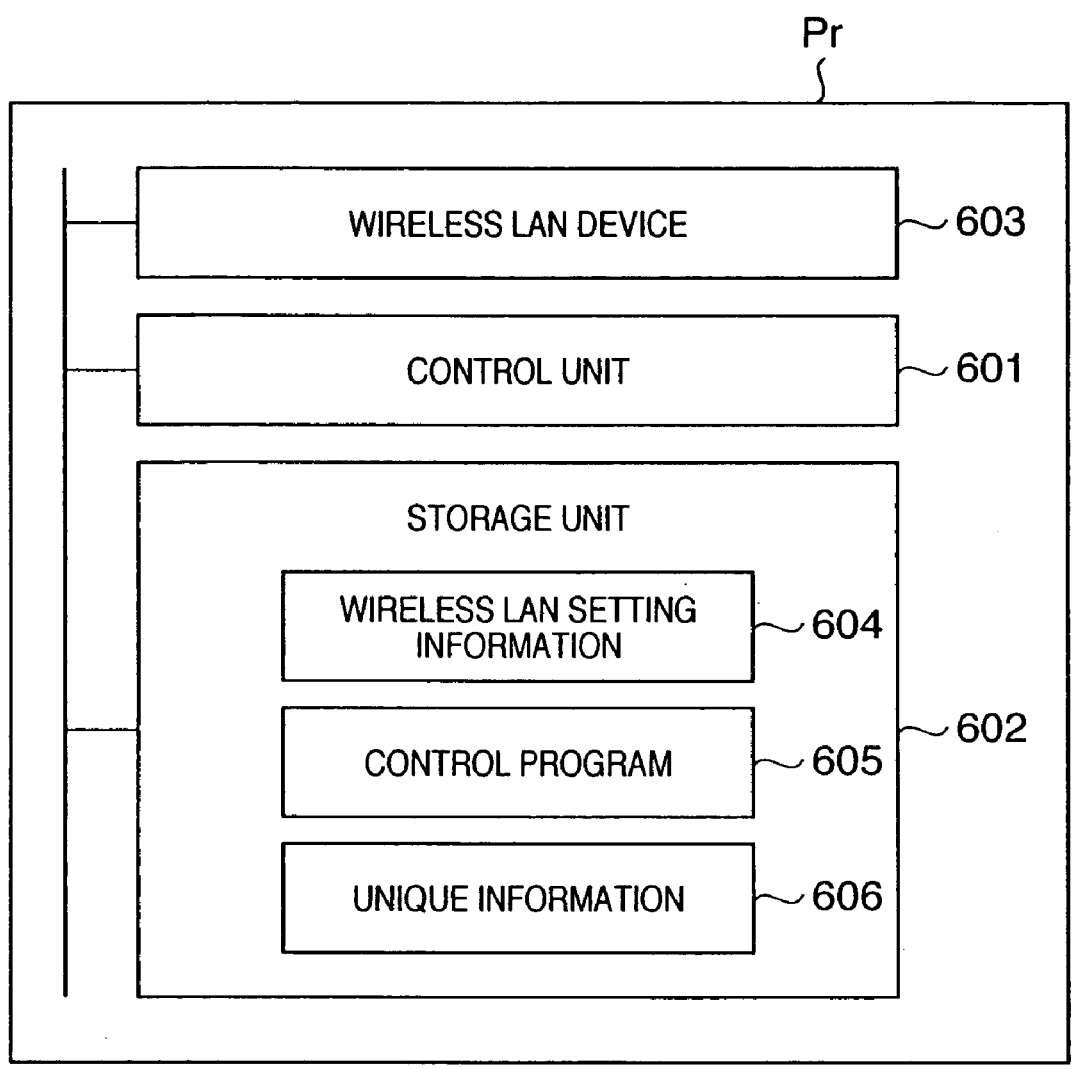
FIG. 6 is a block diagram showing a peripheral device according to the third embodiment.

FIG. 6 is a block diagram showing a peripheral device according to the third embodiment. In FIG. 6, a control unit 601 includes a CPU, a ROM, and a RAM. A storage unit 602, which is used for storing various data and programs, has at least one of a ROM, a RAM a hard disk drive and the like. A wireless LAN device 603, which is a radio communication circuit such as a wireless LAN card, may be incorporated in a peripheral device, or may be connected to the outside of the peripheral device.

The storage unit 602 holds wireless LAN setting information 604, a control program 605, unique information 606 and the like.

Figure 7:
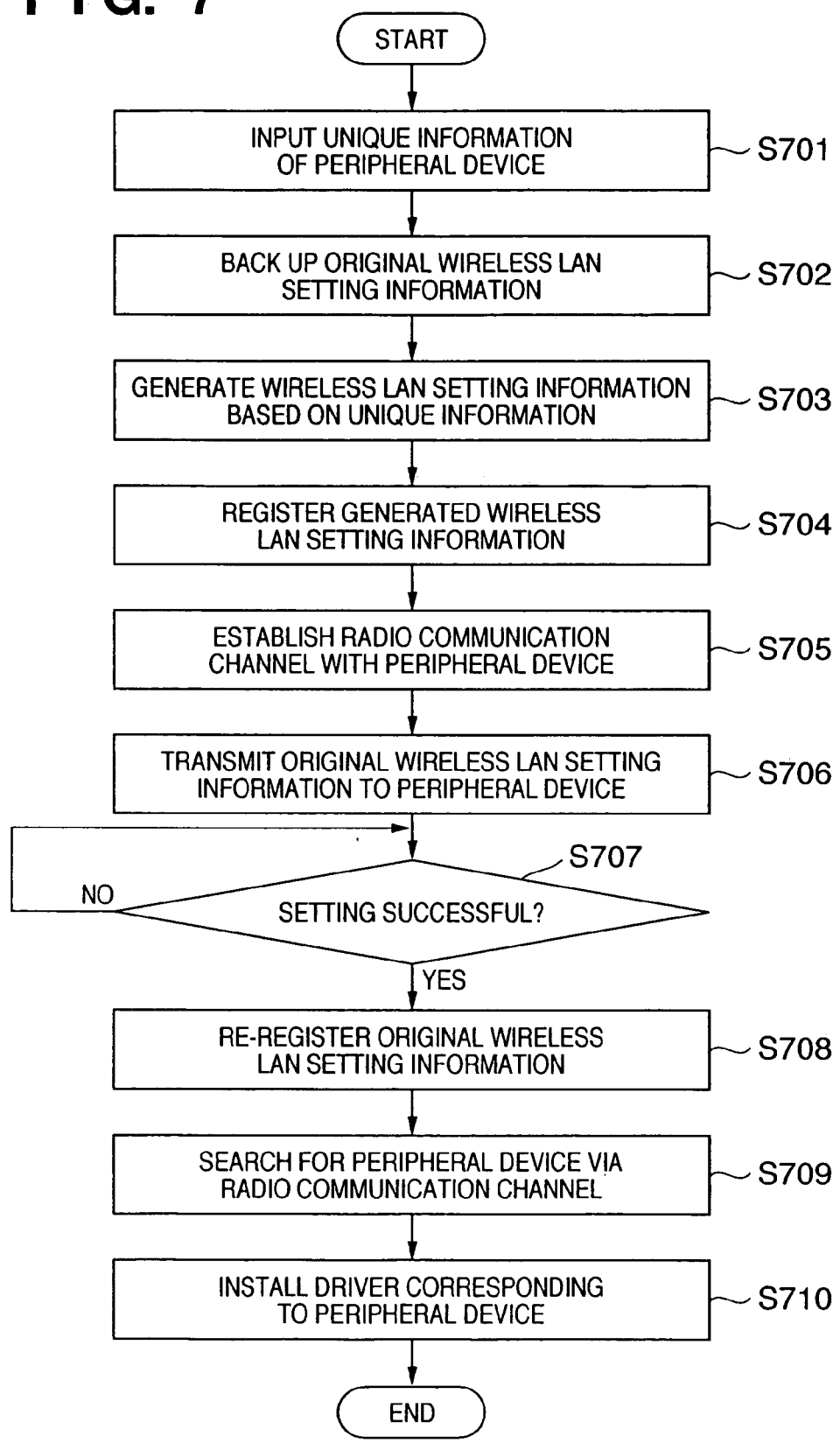
FIG. 7 is a flowchart showing an install program according to the third embodiment.

FIG. 7 is a flowchart showing an install program according to the third embodiment. The is executed when it is started on the computer PC1 or PC2.

At step S701, the control unit 501 receives unique information of the peripheral device inputted from the input unit 504.

At step S702, the control unit 501 backs up the original wireless LAN setting information 504, used upon connection to the access point AP1, as the setting information copy 506, in the storage unit 502.

At step S703, the control unit 501 applies a predetermined generation algorithm to the input peripheral device unique information, thereby generates temporary wireless LAN setting information. The generation algorithm is also included in the peripheral device control program.

At step S704, the control unit 501 registers the generated temporary wireless LAN setting information so as to be used by the wireless LAN device 503. For example, the generated wireless LAN setting information is written over the wireless LAN setting information 504 stored in the storage unit 502.

Note that in a case where the wireless LAN device 503 is set in the infrastructure mode, the control unit 501 changes the communication mode to the ad hoc mode.

At step S705, the control unit 501 applies the temporary LAN setting information to the wireless LAN device 503, thereby establishes a radio communication channel with the peripheral device. Note that in the peripheral device, the same wireless LAN setting information is set based on the unique information in accordance with a flowchart to be desired later.

At step S706, the control unit 501 reads the original wireless LAN setting information copy 506 from the storage unit 502, and transmits the wireless LAN setting information copy 506 from the wireless LAN device 503 to the peripheral device.

At step S707, the control unit 501 determines whether or not the setting (copying) of the wireless LAN setting information in the peripheral device has been successful. If information such as Ack indicating the success of the setting has been transmitted from the peripheral device, it is determined that the setting has been successful. As described above, it may be arranged such that when the Ack signal has arrived, the control unit 501 starts a timer, then determines whether or not a retransmission request has been received by elapse of predetermined period. If a retransmission request has not been received, the control unit determines the setting has been successful.

At step S708, the control unit 501 reads the original wireless LAN setting information copy 506 from the storage unit 502, and writes the original wireless LAN setting information copy 506 over the wireless LAN setting information 504. Thus the original wireless LAN setting information is re-registered in the wireless LAN device 503. Note that if the original wireless LAN setting information is used in the infrastructure mode, the control unit 501 changes the communication mode to the infrastructure mode.

At step S709, the control unit 501 searches for the peripheral device via the radio communication channel. Normally, a search packet is routed to the peripheral device via the access point AP1. The peripheral device receives the search packet, then transmits a response packet including information to specify the peripheral device. Then the personal computer recognizes the existence of the peripheral device on the LAN.

At step S710, the control unit 501 installs a driver corresponding to the peripheral device detected by the search processing.

Figure 8:
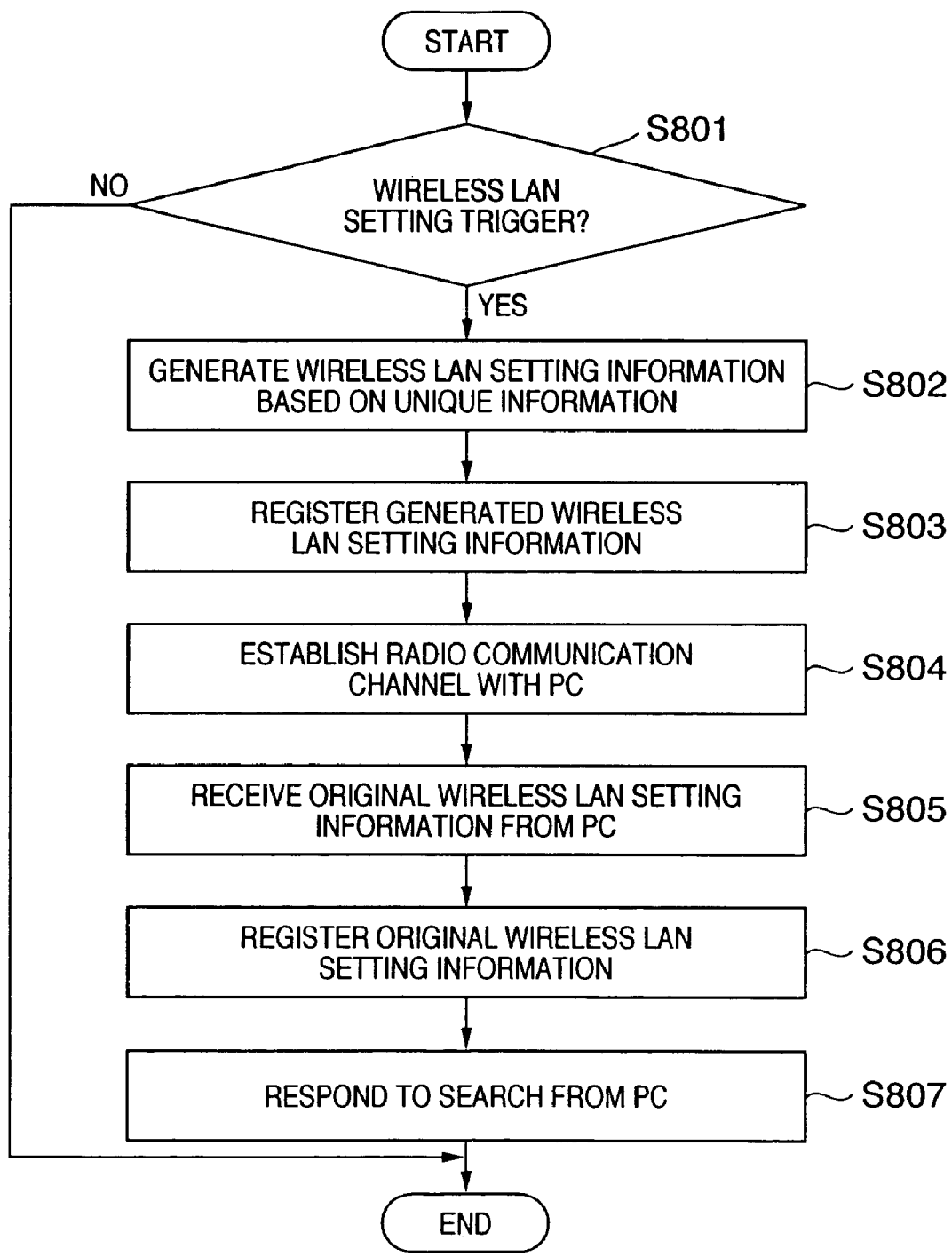
FIG. 8 is a flowchart showing wireless LAN setting processing in the peripheral device according to the third embodiment.

FIG. 8 is a flowchart showing wireless LAN setting processing in the peripheral device according to the third embodiment.

At step S801, the control unit 601 determines whether or not a wireless LAN setting trigger has occurred. The trigger corresponds to, as described above, the connection between the wireless LAN device to the peripheral device, the first power-on of the peripheral device connected to the wireless LAN device, or the depression of reset key of hardware or software. Otherwise, the trigger may correspond to reception of initialization command transmitted from the PC or the like by the wireless LAN device 603.

At step S802, the control unit 601 reads the unique information 606 stored in the storage unit 602, applies the generation algorithm thereby generates temporary wireless LAN setting information.

At step S803, the control unit 601 registers the generated temporary wireless LAN setting information as the wireless LAN setting information 604. Note that it may be arranged such that upon manufacturing of peripheral device, temporary wireless LAN setting information is previously stored in a nonvolatile storage component such as a ROM. In this case, the generation processing at step S802 can be omitted.

At step S804, the control unit 601 applies the temporary wireless LAN setting information to the wireless LAN device 603, and establishes a radio communication channel with the PC.

At step S805, the control unit 601 controls the wireless LAN device 603, to receive original wireless LAN setting information from the PC.

At step S806, the control unit 601 registers the wireless LAN setting information received by the wireless LAN device 603. That is, the received wireless LAN setting information is written over the wireless LAN setting information in the storage unit 602. Thereafter, the control unit 601 applies the received wireless LAN setting information to the wireless LAN device 603 and establishes a radio communication channel. If it is indicated in the wireless LAN setting information that the infrastructure mode should be applied, the control unit 601 sets the wireless LAN device 603 to the infrastructure mode.

At step S807, the control unit 601 responds to a search packet from the PC.

According to the present invention, when wireless LAN setting information is registered for a peripheral device from an information processing apparatus such as a personal computer, original wireless LAN setting information set in the information processing apparatus is backed up, then wireless LAN setting information based on unique information of the peripheral device is set in both information processing apparatus and peripheral device, then a radio communication channel is established between the information processing apparatus and the peripheral device, and the original wireless LAN setting information is copied in the peripheral device via the radio communication channel. Thereafter, the information processing apparatus restores the backed up original wireless LAN setting information.

In this manner, wireless LAN setting information can be easily registered even in a peripheral device having a poor user interface. Further, upon setting, as temporary wireless LAN setting information based on unique information of peripheral device is used, the probability of connection with another wireless LAN system provided in a neighboring house or office can be reduced. Accordingly, a desired peripheral device can be safely connected to a desired wireless LAN system.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program area a floppy disk, a hard disk, an optical disk, a magneto-optical disk, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Further, besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-406543 filed on Dec. 4, 2003 and Japanese Patent Application No. 2004-339966 filed on Nov. 25, 2004, the entire contents of which are incorporated by references herein.

What is claimed is:

1. A method of setting a peripheral device conducting wireless communication from an information processing apparatus, comprising:

a step of temporarily setting a first setting information derived from unique information of said peripheral device, to both said information processing apparatus and said peripheral device;

a step of establishing a wireless network between said information processing apparatus and said peripheral device using said first setting information set at said step of temporarily setting said first setting information;

a step of notifying through said established wireless network a second setting information that had been set in said information processing apparatus before setting of said first setting information, from said information processing apparatus to said peripheral device; and a step of receiving said second setting information and switching from said first setting information to said second setting information, in said peripheral device.

2. The method according to claim 1, wherein said setting step includes a calculation step of calculating at least an ID information, an encryption key or an address information for wireless communication derived from the unique information of said peripheral device.

3. The method according to claim 1, wherein said notifying step includes a step of notifying at least an ID information or an encryption key for wireless communication.

4. The method according to claim 1, wherein said information processing apparatus performs said setting step derived from said unique information inputted upon installation of driver software for said peripheral device.

5. The method according to claim 4, further comprising:
a step of, prior to the execution of said setting step, storing said second setting information, previously set in said information processing apparatus, in a memory of said information processing apparatus and
a step of, prior to said notifying step, reading said second setting information from said memory.

6. The method according to claim 5, wherein said switching step includes a step of changing said first setting information to said second setting information stored in said memory.

7. The method according to claim 4, further comprising:
if said unique information is not inputted upon installation of said driver, skipping said setting step, said notifying step and said switching step.

8. The method according to claim 1, wherein when a wireless device is connected to said peripheral device, or when a power of said peripheral device is first turned on after connection between said peripheral device and said wireless device, said peripheral device performs said setting step.

9. The method according to claim 1, further comprising:
a step of changing said second setting information to said first setting information after said switching step.

10. A method for setting a wireless device, comprising:
a step of setting first setting information derived from unique information of a first device to be connected to said wireless device;
a step of establishing a wireless network between said first device and said second device using said first setting information set at said step of setting said first setting information, wherein said second device applies said first setting information derived from said unique information;
a step of receiving a second setting information from said second device through said established wireless network, wherein said second setting information was applied to said second device before said first setting information is applied to said second device;
a step of switching from said first setting information to said second setting information received from said second device.

11. A method for setting radio parameter of a first device conducting wireless communication from a second device, comprising:
a step of temporarily setting first setting information, derived from unique information of said first device, inputted upon installation of driver software for said first device;
a step of establishing a wireless network between said first device and said second device using said first setting information set at said step of temporarily setting said first setting information, wherein said first device applies said first setting information derived from said unique information of said first device;
a step of sending a second setting information from said second device to said first device through said established wireless network, wherein said second setting information was applied to said second device before said first setting information is applied to said second device; and
a step of switching from said first setting information to said second setting information sent at said step of sending.

12. A peripheral device connected to or including a wireless device, comprising:
a component to temporarily set a first setting information derived from unique information of said peripheral device;
a component to establish a wireless network between said peripheral device and an information processing apparatus using said first setting information, wherein said information processing apparatus applies said first setting information derived from said unique information;
a component to receive a second setting information from said information processing apparatus through said established wireless network, wherein said second setting information was applied to said information processing apparatus before said first setting information is applied to said information processing apparatus:
a component to switch from said first setting information to said second setting information received from said information processing apparatus.

13. An information processing apparatus which sets a wireless device connected to or included in a peripheral device, comprising:
a component to set temporary first setting information derived from unique information of said peripheral device inputted upon installation of driver software for said peripheral device;
a component to establish a wireless network between said peripheral device and said information processing apparatus using said first setting information, wherein said peripheral device applies said first setting information derived from said unique information of said peripheral device;
a component to send a second setting information from said information processing apparatus to said peripheral device through said established wireless network, wherein said second setting information was applied to said information processing apparatus before said first setting information is applied to said information processing apparatus; and
a component to switch from said first setting information to said second setting information sent from said component to send said second setting information.

14. A radio communication system including a peripheral device connected to or including a wireless device and an information processing apparatus which utilizes said peripheral device,
said peripheral device comprising:
a component to temporarily set first setting information derived from unique information of said peripheral device;
a component to establish a wireless network between said peripheral device and said information processing apparatus using said first setting information, wherein said information processing apparatus applies said first setting information derived from said unique information;
a component to receive a second setting information from said information processing apparatus through said established wireless network, wherein said second setting information was applied to said information processing apparatus before said first setting information is applied to said information processing apparatus;
a component to switch from said first setting information to said second setting information received from said information processing apparatus, said information processing apparatus comprising:
- a component to set said first setting information derived from the unique information of said peripheral device;
- a component to establish a wireless network between said peripheral device and said information processing apparatus using said first setting information, wherein said peripheral device applies said first setting information derived from said unique information of said peripheral device;
- a component to send a second setting information from said information processing apparatus to said peripheral device through said established wireless network, wherein said second setting information was applied to said information processing apparatus before said first setting information is applied to said information processing apparatus; and
- a component to switch from said first setting information to said second setting information sent from said component to send said second setting information.

15. The system according to claim 14, wherein at least one of said information processing apparatus and said peripheral device further comprises a component to generate ID information, an encryption key or address information for wireless communication from said unique information, as said first setting information.

16. The system according to claim 14, wherein said second setting information includes at least ID information or an encryption key for wireless communication.

17. The system according to claim 14, wherein said information processing apparatus further comprises a component to generate said first setting information derived from said unique information inputted upon installation of driver software for said peripheral device.

18. The system according to claim 17, wherein said information processing apparatus further comprises a storage unit to back up said second setting information for wireless communication, previously set in said information processing apparatus before the setting of said first setting information,
and wherein said component to transmit said second setting information includes a component to read said second setting information from said storage unit.

19. The system according to claim 18, wherein said component for switching in said information processing apparatus includes a component to read said second setting information stored in said storage unit and change said first setting information to said second setting information.

20. The system according to claim 17, wherein said information processing apparatus further comprises a component to, if said unique information is not inputted upon installation of said driver software, skip the setting of said first setting information, the reception of said second setting information and the switching from said first setting information to said second setting information.

21. The system according to claim 14, wherein said peripheral device further comprises a component to, when said wireless device is connected to said peripheral device, or when a power of said peripheral device is first turned on after connection between said peripheral device and said wireless device, perform setting processing of said wireless device.

22. The system according to claim 14, wherein said peripheral device and said information processing apparatus respectively further comprises a component to, when said first setting information has been changed to said second setting information, change said second setting information to said first setting information again.

23. A computer recordable medium encoded with a computer program for installing driver software for a peripheral device into an information processing apparatus, wherein said computer program includes:
- a step of temporarily setting first information derived from unique information of said peripheral device, inputted upon installation of driver software for said peripheral device;
- a step of establishing a wireless network between said peripheral device and said second device using said first setting information set at said step of temporarily setting said first setting information, wherein said peripheral device applies said first setting information derived from said unique information of said peripheral device;
- a step of sending a second setting information from said information processing apparatus to said peripheral device through said established wireless network, wherein said second setting information was applied to said information processing apparatus before said first setting information is applied to said information processing apparatus; and
- a step of switching from said first setting information to said second setting information sent at said step of sending a second setting information.

* * * * *